United States Patent Office
3,845,160
Patented Oct. 29, 1974

3,845,160
PROCESS FOR THE COPOLYMERIZATION OF TRIOXANE WITH C—O—C GROUPS-CONTAINING COMPOUNDS
Erich Bäder, Hanau, and Herbert Amann, Grossauheim, Germany, assignors to Deutsche Gold- und Silber-Scheideanstalt vormals Roessler, Frankfurt am Main, Germany
No Drawing. Continuation of abandoned application Ser. No. 109,025, Jan. 25, 1971. This application Jan. 15, 1973, Ser. No. 323,928
Claims priority, application Germany, Jan. 26, 1970, P 20 03 270.6
Int. Cl. C08g 1/16
U.S. Cl. 260—823
11 Claims

ABSTRACT OF THE DISCLOSURE

The bulk polymerization of trioxane with C—O—C groups-containing compounds is effected in the presence of a cationic initiator in an open reaction vessel in which a ratio of the area of the surface of the polymerization mixture to the weight thereof is established between 0.04 and 2 cm.$^2$/g. During the reaction a temperature rise in the mixture is caused to at least 100° C. As a result, the unreacted monomeric and other low-molecular compounds are caused to evaporate during the polymerization.

---

This is a continuation of the now abandoned application Ser. No. 109,025, filed Jan. 25, 1971.

BACKGROUND OF THE INVENTION

The present invention relates to a process for the copolymerization of trioxane with compounds which contain at least one C—O—C group.

German published application 1,137,215 discloses a continuous process for the homopolymerization of trioxane in which the trioxane is mixed with a boron trifluoride catalyst in a container which at the same time constitutes the first reaction chamber, whereupon, after a partial polymerization has been effected, the mass is placed in a thin layer on a conveyor belt which constitutes the second reaction vessel, and is disposed in a closed nitrogen-flushed chamber. The final polymerization takes place at temperatures between 80 and 114° C. In a few specific examples of this application, individual discontinuous polymerization mixtures are described which are subjected to polymerization in a reaction flask. However, the conversion in this case amounts only to 72%.

This process is of small industrial interest since it exclusively concerns the homopolymerization of trioxane. In addition, the thus-obtained polymerizate contains still fairly large amounts of unreacted trioxane which must be removed by a one-step or several-step washing procedure.

German published application 1,244,408 describes a process for the continuous copolymerization of trioxane in a tubular synthetic resin structure. The temperature of the polymerization is controlled or adjusted by dipping into a liquid bath.

It has also been proposed to lower the temperatures occurring during the polymerization of trioxane by the addition of radical-forming agents. A further proposal has been to carry out the copolymerization of trioxane in an open-top tubular synthetic plastic structure and to obtain the closing of the tube by bending up the tube ends. In this case it is not necessarily required to maintain a particular temperature during the polymerization reaction.

In all these processes, however, it is necessary always to remove the residual monomers and other low-molecular substances in a separate process step, since they are usually present in fairly large amounts.

It is therefore an object of the present invention to provide for a copolymerization process for trioxane in which the above-indicated shortcomings, and in particular the necessary removal of the residual monomers and other low-molecular compounds is avoided.

SUMMARY OF THE INVENTION

This is accomplished in the invention by carrying out the polymerization in the presence of a cationic initiator in an open reaction vessel in which the ratio of the surface of the polymerization mixture to the weight thereof is established between 0.04 and 2 cm.$^2$/g. and wherein the mixture is subjected to a rise in temperature to at least 100° C., during the polymerization reaction. As a result the unreacted monomeric or other low-molecular compounds are caused to evaporate during the polymerization.

DETAILED DESCRIPTION OF THE INVENTION AND OF SPECIFIC EMBODIMENTS

An important feature of the process of the invention is that, in the first place, the rising heat of polymerization is not discharged by specific manipulative measures since a specific and constant polymerization temperature is not necessary, and that the heat of polymerization is even desirable and is used to cause the unreacted trioxane and other volatile compounds to evaporate.

Secondly, there is maintained a specific ratio of the surface of the mixture to its weight in order (a) to permit an unobstructed evaporation by a comparatively large surface and (b) to reduce the heat discharge so as to provide for the necessary amount of heat for the evaporation.

As against prior-art procedures, the process of the invention has the advantage that there are left virtually no residual monomers, that is, the contents of residual monomers is for instance not in excess of 1%, or that at least the amount is so small that a removal in a separate step is not necessary. The small amounts which may still be present are removed by the normal handling in the extrusion apparatus, or by subsequent steps taken to improve the thermal stability, for instance by hydrolysis of the unstable terminal groups.

Compared with the prior-art procedures where a specific low reaction temperature is maintained by means of a tempering bath, no lowering of the yield occurs in the process of the reaction in spite of the evaporation. On the contrary, the yield is sometimes higher. In particuluar, polymerization is possible in a heavy layer without any additional action such as exterior cooling, etc. because the cooling effect of the evaporating trioxane will help avoid excessive temperatures. This results in high average yields.

Accordingly, no action is necessary for heat discharge during the polymerization, nor must the continuous polymerization be split up in two separate operations as this is necessary, for instance, in the published German application 1,137,215. In the process of the invention, it is even desirable that the polymerization take place at a rapid rate without specific control means and that the polymerization mass be brought to a temperature which is above 100° and preferably should be between 110 and 130° C. This temperature and, accordingly, the amount of heat available for the evaporation depends on the type of initiators and on the ratio of total surface of the polymerization mass to its weight. The maximum removal of unreacted trioxane by evaporation is materially based on the amount of heat which is released per unit of time during the polymerization. So much more rapidly as the polymerization is effected, so much smaller is the amount of heat which is discharged into the surrounding area and so much larger is the part of the total heat which effects the temperature rise in the polymer block or is available for the trioxane evaporation. The heat which occurs during the polymerization is composed of the reaction heat as such (from the polymerization reaction) and, on the other hand, of the crystallization heat of the simultaneously crystallizing polymers. All action which accelerates the speed of the polymerization and the simultaneously occurring crystallization reduces, accordingly, the amount of extractables, particularly the amount of trioxane in the crude polymer.

REACTION INITIATORS

It is therefore advantageous for the process of the invention to carry out the polymerization in a heavy layer and to use highly active initiators. With these particularly effective catalysts, a much smaller concentration is necessary to start the polymerization. Besides, they result in a higher yield and in a much steeper temperature rise. These highly active catalysts are particularly useful for making polymerizates which have a low content of trioxane.

The term "highly active initiators" in this connection is intended to refer to initiators which lead to a temperature in the polymerization mass of at least 110° C. in a concentration of 2 m.p.m. (2 moles of catalyst per million moles of trioxane), and with reference to a monomer mixture which contains 2.5% of 1,3-dioxolane and further an initial mass of 2 moles trioxane and a carrying out of the polymerization in a cylindrical glass vessel of a cross section of 40 mm.

The degree of purity of the monomer mixture in this case is this:

content of water—below 20 p.p.m.
content of formaldehyde and formic acid, each—below 50 p.p.m.
other impurities—below 50 p.p.m.

The initiators are employed in amounts up to 20 m.p.m., for instance in an amount of 0.01 up to 2 m.p.m. and preferably between 0.1 and 1.0 m.p.m.

The induction time with these highly effective catalysts may be up to 300 seconds, and preferably is between 2 and 100 seconds. The induction time refers to the time interval which passes between the addition of the initiator and the occurrence of the initial turbidity in the mass. The lower limit of the induction time is based on the industrial practicality of the process. A minimum induction time of a few seconds, for instance between 2 and 3 seconds, is necessary in order to obtain a uniform distribution of the catalyst in the polymerization mixture.

Such highly effective cationic catalysts are particularly the following:

perchloric acid, perchloric acid derivatives as well as fluorine-containing initiators. Fluorine-containing initiators are for instance fluoro compounds of antimony and arsenic and complexes derived from them, for instance:

$SbF_5$, $NOSbF_6$, $NOAsF_6$;
carboniumhexafluoroantimonates, e.g.
triphenylmethylhexafluoroantimonate,
diphenylmethylhexafluoroantimonate,
phenylditolylmethylhexafluoroantimonate,
tolyldiphenylmethylhexafluoroantimonate,
tritolylmethylhexafluoroantimonate,
dioxoliniumhexafluoroantimonate,
acetylhexafluoroantimonate,
benzoylhexafluoroantimonate,
trialkyloxoniumhexafluoroantimonate,
phenyldiazoniumhexafluoroantimonates,
iodoniumhexafluoroantimonate,
nitrilehexafluoroantimonate

[cf. Chemical Abstracts, 65, 1966 col. 828d, e]. Likewise, the following fluoro-containing initiators may also be used: $SbF_{5-x}R_x$, $SbF_{6-y}A$ wherein R is chlorine, bromine, alkyl-, aryl-, alkoxy or fluorosulfonyl, wherein A has the same meaning as R or is OH, $x$ is 1 or 2 and $y$ is 1, 2 or 3.

As perchloric acid derivatives there may particularly be used perchloric acid esters, preferably esters with aliphatic alcohols such as for instance tert-butylperchlorate, methoxymethylperchlorate or esters with aromatic or aliphatic alcohols, like triphenylmethylperchlorate, methyldiphenylmethylperchlorate, dimethylphenylmethylperchlorate, of perchloric acid anhydrides, preferably anhydrides of perchloric acid and carboxylic acids such as acetylperchlorate, benzoylperchlorate, or ether- or ketoneperchlorates as well as inorganic perchloric acid derivatives, such as are e.g. listed in Gmelin's "Handbuch der organischen Chemie, 8th ed., system Nr. 6, pages 391 to 400+Supplement B, pp. 463 to 465.

Examples for inorganic perchloric acid derivatives are: salts of perchloric acid, anhydrides of perchloric acid with inorganic acids (for instance $NOClO_4$), metal-organic perchlorates (for instance trimethylsilylperchlorate, triphenylstannylperchlorate), as well as iodoniumperchlorate, telluriumperchlorate, antimonylperchlorate and talliumperchlorate.

It will be understood that the process of the invention can of course also be carried out with initiators which have a lower activity than those just listed. Such less active initiators can be defined as those which with a polymerization mass including a trioxane of the purity and under the reaction conditions as described in connection with the high high activity initiators result in a temperature in the polymerization mixture below 110° C. but of at least 100° C. In order to have sufficiently high temperatures with these initiators, it is therefore necessary to use higher concentrations. The upper limit of the concentration is determined by the fact that a minimum induction time must be obtained in order to obtain a uniform distribution of the initiator. An increase of the initiator concentration generally results in a shortening of the induction time. The less-active initiators are therefore used in such concentrations that the induction time is not more than 100 seconds. Advantageous is an induction time in this case between 2 or 3 and 50 seconds. Generally preferred is an induction time between 3 and 30 seconds.

With these initiators of lower activity, polymerizates can be obtained of the same extractable concentration as with the highly active initiators if the polymerization is carried out in a heavier layer and/or the polymerization mass is maintained at the higher temperature for a longer period of time, if, in other words, the cooling is not immediately effected. Usually, all three factors will be made use of and adjusted relative to each other.

The effect of the polymerization mass in respect of the temperature in the polymerization mixture may be illustrated by the following data. A comparable polymerizate under otherwise identical conditions which would require an initial polymerization mass of, for instance, about 200 g. with a highly active perchloro-initiator can be obtained in the same manner with a less active initiator by increasing in the initial mass to fifteen times the comparison of a vacuum.

PROCESS FEATURES

As polymerization vessels, conventional vessels with an open top and similar apparatus can be used of any desired cross-section and shape. The form and height of the side walls preferably is such that no back-flow of the evaporating materials occurs. It is also possible, however, to prevent or diminish a possible condensation by means of a vacuum.

The critical factor, however, is the specific ratio of surface area of the mixture after introduction into the polymerization vessel relative to its weight, which as indicated should be between 0.04 and 2 cm.$^2$/g. Advantageous is a ratio larger than 0.05 cm.$^2$/g. and preferably between 0.06 and 2 cm.$^2$/g. If highly active initiators such as perchloric acid initiators are used, a ratio for instance between 0.1 and 1 is particularly useful.

Of specific use are also vessels with side walls which form an inside angle with the bottom of the vessel which should not be below 90°, in other words, bowl-shaped vessels. The structural material of the vessels may be of any kind, but must be inert under the conditions of the polymerization. In many cases it is desirable to use vessels with a release coating, for instance of polytetrafluoroethylene.

The thickness of the mixture in the vessel which is to be polymerized should be larger than 2.5 and for instance may be between 5 and 10 cm. The process can well be practiced also with layers thicker than 10 cm.

Under these circumstances it is useful to preheat the polymerization vessel. The preheating temperature depends on the material and the size of the vessel. These temperatures may for instance be between 60 and 150° C. A preheating is particularly advisable in case of a batchwise process. With a continuous process in which the same vessels are again and again used in a specific cycle, the heating is usually sufficiently effected by the preceding polymerization step.

The cooling of the polymerizate can be effected in conventional manner. A quick cooling is for instance accomplished by chilling the polymer by direct dipping, if necessary within a special protective covering or also within the polymerization vessel, into a liquid such as water or an organic medium, for instance methanol, methylal, etc. The mass can also be subjected to wet grinding upon simultaneous cooling. Liquids useful for the wet grinding are for instance methanol, methylal, water, aqueous buffered solutions, etc. Further possibilities of a rapid cooling are for instance the blowing in of a cold protective gas or the use of a cooled conveyor belt or a cooled conveyor screw. In order to obtain a quick cooling, it is advisable to subject the polymerizate to a preceding comminution.

It will be understood, however, that the polymerizate may also be cooled slowly, for instance by simple storing in air or by passing a gas over the mass, etc.

A slow cooling is in many cases useful in connection with the extractables concentration since this usually results again in a reduction of any volatile materials that may still be present. This effect is stronger the higher the temperature of the polymerizate was during the polymerization.

The extractables can further be reduced by heating the polymers (which may have been comminuted) after the polymerization and, if desired, upon exclusion of oxygen in or without a vacuum. This heating can be carried out generally up to temperatures of about 140° C. It may be useful to add conventional stabilizers and antioxidants, etc., prior to the heating step.

It is not necessary to carry out the polymerization upon exclusion of oxygen. On the other hand, it is not desirable to permit the polymerizate to be exposed to the air for extended periods of time to higher temperatures, for instance above 115° C. The polymerizate is preferably either rapidly cooled or, in case of a slow cooling, a protective gas is employed.

The process of the invention can be carried out under normal atmospheric conditions, that is it can be practiced in the open air with normal humidity content without specific protective action. However, an inert protective gas such as nitrogen may be used.

To carry out the process there may for instance be used conveyor belts of steel or synthetic plastic with bent-up edges or with flexible borders attached to the edges of the belts. Furthermore, conveyor devices may be used of the drag-chain conveyor type. Particularly useful is a tray-type embodiment, or, as a variant, an embodiment wherein the tray is replaced by sector-type troughs or bowls which are rotatably suspended from the spokes of a wheel having a vertical axis. With this type of apparatus only less than one-half of the vessels is necessary, which would be required with a drag-chain conveyor, and the cleaning-out of the vessels prior to each new cast may be omitted if desired, since the removal of any residual mass is effected immediately prior to the next cast by tilting of the troughs and because the residual mass in the container is exposed to the atmosphere only for a very short period of time.

A tray-like apparatus has also the advantage that, because of its compact structure, it is comparatively easy to operate under a protective gas atmosphere and monomer vapors can easily be removed.

Preferred is an apparatus, in connection with the process of the invention, which consists of a rotary merry-go-round arrangement of tiltable bowls. The bowls in this case move on a circular track continuously below an inlet tube and are thus filled. The solid polymerizate drops out when the bowls are tilted prior to completion of a complete revolution.

The material that evaporates during the polymerization is removed or taken up for instance by use of a vacuum, by suction or by means of a protective gas and, possibly after purification, may again be introduced into the process.

UTILITY

The process of the invention is broadly suited for the block copolymerization of trioxane to form solid polymerizates and is quite independent of the nature of the particular coplymer. The copolymerization of trioxane may for instance be carried out with compounds which have polymerizable oxygen functions such as ethers, acetals, ketals, esters, etc. Among these are particularly compounds which have at least one COC group in cyclic or acyclic arrangement such as for instance cyclic aliphatic or cyclic araliphatic acetals, particularly formals or ketals, particularly of aliphatic dioles and oxadioles, such as 1,3-dioxolane, 1,3-dioxacycloheptane, trioxane, trioxepane, cyclic aliphatic or cyclic araliphatic esters, e.g. lactones such as pivalolactone, ε-caprolactone, cyclic aliphatic or cyclic araliphatic ethers, such as trimethyleneoxide, epichlorohydrin, other olefinoxides, styreneoxide or polymeric esters, acetals and ethers such as polydioxolane, polyepoxides, copolymers of trioxane and ethyleneoxide, condensation products of diols or polyhydric alcohols (glycerol) and formaldehyde or other aldehydes, etc. As the last examples show, the compounds to be copolymerized may themselves already be present as polymers (so-called pre-polymerizates).

The most important use of the invention is with such comonomers or also polymeric compounds which lead to polyoxymethylenes with interspersed oxyalkylene units (alkylene of at least two carbon atoms, preferably at 2–5 carbon atoms). Examples are the above-noted cyclic acetals, ethers or polymeric acetals and ethers. The ratio of the initial components in these cases is not critical. The amount of trioxane preferably, however, is not below 90%.

However, there can also be used other comonomers and polymeric compounds which are generally employed for copolymerization with trioxane. Such may for instance be compounds with a CC-double- or triple bond, such as styrene, acrylonitrile, copolymerizates of methyl methacrylate and styrene, etc. Possible also is the addition of chain-transfer agents by which stable terminal groups can be incorporated in the compounds. Such chain-transfer agents are, for instance, aliphatic or araliphatic or aromatic linear ethers, for instance dibenzylether, diisopropylether, as well as acetals, ketals, esters or anhydrides.

In addition to such compounds which participate in the polymerization, further additives may be employed such as softeners, stabilizers of various kinds, dyes, pigments, fillers, blowing agents, chain stoppers, etc.

It is further possible to use compounds with more than one polymerizable group as comonomers or also as the prepolymerizates, and thus to obtain cross-linked products.

The process of the invention permits to obtain a polymerizate which contains virtually no, or only insignificant, amounts of trioxane or other volatile components. The separate step of removal of the residual trioxane is therefore no longer necessary. It is generally possible to remove in this manner 50% of the unreacted trioxane. Preferably the removal is carried out up to 70% and higher. It is of course also possible to carry out the process in a way that virtually all nonreacted trioxane is removed.

The non-reacted comonomers are likewise removed depending on their volatility. However, their removal occurs at a lower ratio than that of the trioxane. The remaining amounts are in any case so small that the removal of these amounts in subsequent process steps, for instance in case of the hydrolysis of unstable terminal groups or during extrusion, will be effected automatically.

The process of the invention permits to obtain yields of at least 80%. In order to have such high yields with the less-active initiators, it is necessary to maintain short induction times, for instance below 60 seconds. With the more active initiators, such high yields can be obtained also with longer induction times. The polymers obtained by the process are distinguished by a loose porous structure and can therefore be comminuted with greater ease than a polymerizate formed from the same starting products which, however, still contains all of the residual monomers.

The crude polymers obtained in the process of the invention in addition have a high thermal stability. They suffer for instance only 2–4% weight loss during heating to 220° C. for 2 hours under nitrogen after prior destruction of the catalyst by boiling with an ammonium carbonate solution. After degradation of the unstable terminal groups and/or addition of conventional stabilizers the weight loss is even below 0.5%.

The following examples will further illustrate the tion. The yield in all of these examples is relative to the employed monomer mixture. The viscosity and the thermal stability were determined with crude polymerizates which after preceding comminution were subjected to boiling for 1 hour with an 0.1% concentration aqueous ammonium carbonate solution in order to destroy the catalyst.

EXAMPLE 1

493.7 g. of substantially anhydrous trioxane, 20.6 g. 1,3-dioxolane and 0.7 g. butylal (di-n-butoxymethane) were rapidly and vigorously mixed in a beaker with 10 mg. $BF_3$ (as the n-dibutyletherate dissolved in 4 ml. 1,2-dichloroethane). The temperature of the mixture at that point was 80° C. The quotient of surface area to weight of the mass was 0.13 cm.$^2$/g.

After an induction time of 15 seconds, the mass started to become turbid. Shortly thereafter it was solid. The temperature in the polymer block increased up to 104° C. which caused the unreacted trioxane to evaporate. After cooling down, the polymer block had a weight of 420 g. The polymer still contained 2.9% extractable fractions, predominantly trioxane. These were eliminated in the conventional aftertreatment such as by destruction of the catalyst during extrusion in the presence of sodium carbonate, by hydrolytic degradation, etc.

The yield was 79%.

The viscosity of the polymer dissolved in dimethylformamide at a temperature of 135° C. was as follows: $\eta_{sp}/c.=0.62$ (100 ml./g.).

EXAMPLE 2

A mixture of 354.6 g. of substantially anhydrous trioxane and 39.4 g. of 1,3-dioxolane were reacted at 70° C. upon rapid and vigorous stirring with 0.48 mg. tert.-butylperchlorate which was dissolved in 2 ml. of a mixture of 99.4 vol. percent 1,2-dichloroethane and 0.6 vol. percent nitromethane. The reaction was carried out in a bowl of stainless (V2A) steel which had the shape of a truncated cone. The quotent of surface area to weight of the mass was 0.26 (cm.$^2$/g.).

After an induction time of 38 seconds, the temperature rapidly rose to 117° C. The polymer block was deformed 5 minutes after adding the catalyst. It had a weight of 323 g. The block was divided into three parts in order to examine the effects of different cooling conditions.

The first part was cooled in the open air. The second part was evacuated for 1 hour at 65° C. at a pressure of about 15 torr. The third part was placed in a polyethylene bag and then cooled rapidly by suspending the bag in a water bath. The different specimens obtained were comminuted and the contents of extractables found by boiling with 1% aqueous ammonium carbonate solution. The results appear from the following table:

| Part | Extractables content (percent) | Weight loss after 2 hours at 220° C. under a nitrogen atmosphere (percent) |
|---|---|---|
| 1 | 4.6 | 3.9 |
| 2 | 2.6 | 3.3 |
| 3 | 5.3 | 2.0 |

The yield (calculated from Part 3) was 80%.

EXAMPLE 3

A mixture of 179.3 g. of substantially anhydrous trioxane, 6.5 g. 1,3-dioxolane and 0.2 g. methylal was reacted with 0.11 mg. aqueous 70% perchloric acid dissolved in 0.5 ml. dimethylglycol. The reaction was carried out at 70° C. in a crystal glass bowl while rapidly and vigorously stirring. The ratio of surface area to weight of the mass was 0.36 (cm.$^2$/g.). After an induction time of 8 seconds the temperature rapidly rose to 115° C. 5 minutes after the addition of the catalyst the polymer block was placed in a polyethylene bag and cooled rapidly by suspending the bag in a water bath. The extract content was 4.2%. The polymer had a viscosity of $\eta_{sp}/c.=0.43$ (100 ml./g.) and after two hours heating to 220° C. in a nitrogen atmosphere lost only 4.2% of its weight. The yield was 85.5%.

EXAMPLE 4

A mixture of 970 g. substantially anhydrous trioxane and 30 g. polymeric 1,3-dioxolane (viscosity number $\eta_{sp}/c.=0.32$ (100 ml./g.), measured in chloroform was rapidly and vigorously stirred at 70° C. into 0.79 mg. tert.-butylperchlorate (dissolved in a mixture of 99.4 vol. percent -,2-dichloroethane and 0.6 vol. percent nitromethanol. The mass was then immediately poured into a preheated enamel bowl of the dimension of 28 x 34 x 6 cm. The ratio of surface area to weight of the mass was 0.95 (cm.$^2$/g.). After an induction time of 52 seconds, the temperature in the polymerized mass started to rise rapidly and after about 3 minutes reached its maximum of 116° C. 5 minutes after addition of the catalyst, the polymerizate was removed from the bowl and was weighed after another 5 minutes. The weight was 883 g. The polymerizate which was still hot was then immediately ground and the ground mass was caused to drop into 1.5 l. methanol in order to cool the hot polymer as quickly as possible. The product then contained only 2% of extractable fractions as could be determined by one hour boiling with 0.2% ammonium carbonate solution.

The yield was 86.5%. The weight loss after 2 hours heating to 220° C. in a nitrogen atmosphere was 3.5%.

EXAMPLE 5

A mixture of 358.2 g. of substantially anhydrous trioxane, 11.1 g. 1,3-dioxepane and 0.7 g. butylal (di-n-butoxymethane) were stirred vigorously at 70° C. with 0.6 mg. antimony pentafluoride (dissolved in 4 ml. 1,2-dichloroethane). The mixture was effected in a stainless steel (V2A) bowl of the form of a truncated cone. The quotient of surface area to weight of the mass was 0.28 (cm.$^2$/g.). After 120 seconds, the mass started to become turbid and shortly thereafter solidified. The temperature in the polymer block rose very rapidly up to 129° C. 5 minutes after adding the catalyst the polymer block was removed from the bowl. After another 5 minutes it was weighed. Its weight was 306 g. The still hot polymerizate was then immediately ground and the ground mass was caused to drop into 600 ml. aqueous 0.1% ammonium carbonate solution in order to cause it to cool as rapidly as possible. After 1 hour boiling and refluxing and subsequent removal by suction, washing, and drying, there were obtained 301 g. of polymer from which the extraction content could be calculated as 1.7%. The yield was 81.4%. The viscosity number was $\eta_{sp}/c.=0.50$ (100 ml./g.).

EXAMPLE 6

A mixture of 365.9 g. of substantially anhydrous trioxane, 11.3 g. of 1,3-dioxepane and 0.8 g. butylal (di-n-butoxy methane) was vigorously stirred at 70° C. with 0.45 mg. antimony pentafluoride (dissolved in 3 ml. 1,2-dichloroethane). The mixing was carried out in a stainless (V2A) bowl of the form of a truncated cone. The ratio of surface area to weight of the mass was 0.28 (cm.$^2$/g.). After 210 seconds, the mass began to become turbid and shortly thereafter solidified. The temperature in the block rose up to 108° C. 10 minutes after adding the catalyst, the polymer block was removed from the bowl in which about 20 g. of liquid monomer mixture remained. The weight of the polymer block was 300 g. The polymer block was rapidly cooled by placing it in a polyethylene bag which was dipped into cold water. The obtained polymerizate contained 6.1% extractable fractions. The yield was 74.7%.

EXAMPLE 7

A mixture of 3,124 g. substantially anhydrous trioxane and 78 g. 1,3-dioxolane was stirred at 70° C., rapidly and vigorously with 15.2 mg. tin tetrachloride (dissolved in 9 ml. 1,2-dichloroethane). The mixing was carried out in an aluminum vessel of the form of a truncated cone (bottom diameter 14 cm. top diameter 23.5 cm., height 20 cm.). The ratio of surface area to weight of the mass was 0.098 (cm.$^2$/g.). The mass began to become turbid after 4 seconds. Shortly thereafter it was in the form of a slurry, and a few minutes later it solidified. The temperature in the polymer block rose up to 108° C. The polymer block was deformed after 15 minutes and permitted to cool in the open air. Thereafter it still had a weight of 2,600 g. and contained 4.5% of extractable fractions. The yield was 78.0%.

EXAMPLE 8

A mixture of 184.3 g. of substantially anhydrous trioxane and 4.7 g. ε-caprolactone was rapidly and vigorously stirred at 70° C. with 36 mg. BF$_3$ (dissolved in 0.4 ml. n-dibutylether). The mixing was carried out in a cylindrical glass container of an inner diameter of 4.1 cm. The ratio of surface area to weight of the mass was 0.07 (cm.$^2$/g.). After 23 seconds the mass began to become turbid and soon thereafter solidified. The temperature in the polymer block rose up to 151° C. The cast was deformed after 5 minutes and permitted to cool in the open air. The mass then still had a weight of 183 g. and contained 2.4% of extractable fractions. The yield was 94.4%.

EXAMPLE 9

A mixture of 96.8% of substantially anhydrous trioxane, 3% of 1,3-dioxolane and 0.2% butylal (di-n-butoxymethane) was placed in a stirring vessel and adjusted to a temperature of 70° C. This type of mixture was then continuously pumped into an endless belt of glass fiber reinforced polytetrafluoroethylene in an amount of 10.8 kg./min. While flowing in continuous stream from the stirring vessel to the conveyor, the mass was passed through a mixing chamber in which it was vigorously mixed with the catalyst solution. The catalyst solution contained 0.2 g. tert.-butylperchlorate per liter of dimethylglycol and was added in an amount of 15.3 ml./min.

The conveyor belt was directed at a downward slant to the inlet place and from there was disposed horizontally. The edges of the belt were bent up by baffle plates shortly prior to the inlet place and throughout the polymerization zone in order to prevent lateral drainage of the liquid mixture. The useful width of the belt was about 20 cm.

Upon starting a fitting piece of a closed pore foaming material was pressed onto the belt in order to provide a frontwise seal. After commencement of the polymerization, the sealing was effected by the polymer itself. The velocity of the belt was 1.5 m./min., the ratio of surface area to weight of the polymer was 0.29 (cm.$^2$/g.). The belt had a useful length of 10 m. The polymerization commenced about 1 m. after the inlet place. The escaping vapors were removed by suction and absorbed in a washing tower. At the end of the belt the polymer dropped into a crusher and was there ground in a nitrogen atmosphere. It was then passed into a storing vessel which was also provided with a nitrogen atmosphere. The contents of extractables was 1.8%. After adding a neutralizing agent, for instance sodium carbonate, and the usual stabilizers against oxidative and thermal decomposition, the ground mass was granulated in a degassing extruder.

There was obtained a granulate of very high thermal stability which was particularly suited for making articles in an injection process.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for producing polyoxymethylenes interspersed with oxyalkylene units by the bulk copolymerization of 1,3,5-trioxane and at least one compound selected from the group consisting of cyclic aliphatic and cyclic araliphatic ethers, cyclic aliphatic acetals, cyclic aliphatic esters, polydioxolane and condensation products of diols and formaldehyde that are copolymerizable with 1,3,5-trioxane, which process comprises (a) mixing together the 1,3,5-trioxane and the compound that is copolymerizable therewith together with a cationic initiator of the group consisting of perchloric acid, derivatives of perchloric acid, stannic tetrachloride, fluoro compounds of antimony, fluoro compounds of arsenic and complexes derived from these fluoro compounds, (b) placing the mixture into an open reaction vessel of such dimensions that the ratio of the area of the surface of the mixture to its weight is maintained between 0.04 and 2 square centimeters per gram, (c) thereby, after an induction period, producing polymerization of the mixture as a result of the heat of reaction and the heat of crystallization of the polymer crystals that form, without external cooling or application of other means for removing the heat thereby generated, the temperature of the mixture thus increasing to at least 110° C., the concentration of the said cationic initiator being between 0.01 and 2 mols per million mols of trioxane and being sufficient to produce an induction period between 2 and 300 seconds, and the unreacted monomeric or other low molecular compounds being evaporated from the mixture during its polymerization as a result of the said temperature increase.

2. The process of claim 1, wherein the copolymerizable compound is a cyclic acetal, an acyclic polyacetal or a mixture of these two compounds.

3. The process of claim 1, wherein the reaction mass after completion of the polymerization is subjected to a slow cooling-down step.

4. The process of claim 3, wherein the slow cooling-down is effected under an inert protective atmosphere or in a vacuum.

5. The process of claim 1, wherein an initiator is employed of a type causing the induction time to last from 2 to 100 seconds.

6. The process of claim 1, wherein $HClO_4$ or a perchloric acid derivative is employed as the initiator.

7. The process of claim 1, wherein a fluorine-containing antimony or arsenic compound is used as the initiator.

8. The process of claim 1, wherein an initiator is employed of a type causing the induction time to last between 2 and 50 seconds.

9. A process as defined in claim 1 for the bulk copolymerization of 1,3,5-trioxane and a compound of the group consisting of 1,3-dioxolane, 1,3-dioxepane, epsilon-caprolactone, and poly(1,3-dioxolane) that is copolymerizable therewith, which process comprises (a) mixing together in an open reaction vessel a preponderant amount of 1,3,5-trioxane with a minor amount of one or more of the said components that are copolymerizable therewith together with a cationic initiator of the group consisting of boron trifluoride, antimony pentafluoride, stannic tetrachloride, perchloric acid, and tertiary-butyl perchlorate, the said reaction vessel being of such dimensions that the area of the surface of the mixture that is present therein is between 0.04 and 2.0 square centimeters per gram of the mixture, and the amount of the cationic initiator being between 0.01 and 2 mols per million mols of the trioxane and being sufficient to produce an initial turbidity of the mixture within a period between 2 and 300 seconds after addition of the cationic initiator to the mixture, and (b) thereafter permitting the polymerization to proceed as the temperature gradually increases spontaneously to at least 100° C. without external cooling or other restraint while the unpolymerized components of the mixture are expelled therefrom as vapor and the mixture solidifies into a solid block substantially free from unpolymerized components.

10. A process as defined in claim 9 in which the reaction mixture that is polymerized contains at least 90% by weight of 1,3,5-trioxane.

11. A process as defined in claim 1 in which the cationic initiator is boron trifluoride in a concentration that is sufficient to produce an induction period between 2 and 100 seconds.

References Cited
UNITED STATES PATENTS 3,316,217　　4/1967　　Weissermel _____ 260—67 FP LUCILLE M. PHYNES, Primary Examiner U.S. Cl. X.R.

260—67 FP